United States Patent

[11] 3,625,310

| [72] | Inventor | David B. Herrick |
| --- | --- | --- |
| | | Connersville, Ind. |
| [21] | Appl. No. | 4,376 |
| [22] | Filed | Jan. 20, 1970 |
| [45] | Patented | Dec. 7, 1971 |
| [73] | Assignee | Dresser Industries, Inc. |
| | | Dallas, Tex. |

[54] GEARBOX LUBRICATION
5 Claims, 4 Drawing Figs.

[52] U.S. Cl. ................................................ 184/6.12,
184/13 R
[51] Int. Cl. .................................................... F16n 7/26
[50] Field of Search ........................................ 184/6 TT,
15 R, 11 R, 11 A, 13 R, 103 R, 96

[56] References Cited
UNITED STATES PATENTS

| 946,923 | 1/1910 | Teeter ........................... | 184/13 |
| 1,220,810 | 3/1917 | Alquist ......................... | 184/11 X |
| 1,693,812 | 12/1928 | Edwards ...................... | 184/96 |
| 1,960,693 | 5/1934 | Bryant .......................... | 184/15 |

Primary Examiner—Manuel A. Antonakas
Attorneys—Robert W. Mayer, Thomas P. Hubbard, Jr., Daniel Rubin, Raymond T. Majesko, Roy L. Van Winkle, William E. Johnson, Jr. and Eddie E. Scott ABSTRACT: A gearbox having an improved drain and liquid level equalizing arrangement therein. The gearbox includes a housing having meshing gears mounted therein and containing a liquid for lubricating and cooling the gears. A drain opening extends through the lower side of the housing and is threaded to receive a drain plug. A baffle is positioned in the housing and has a port therein in alignment with the drain opening. The drain plug has an extension thereon that projects, in one position, into the port in the baffle. The extension of the drain plug is provided with a passageway whereby fluid can flow from within the baffle into the housing therein below. The drain plug can be moved to a second position wherein the extension on the drain plug is removed from the port permitting rapid fluid communication between the interior of the baffle and the housing therein below when it is desired to accurately determine the level of the liquid in the gearbox.

PATENTED DEC 7 1971  3,625,310

INVENTOR:
DAVID B. HERRICK

Roy L. Van Winkle
ATTORNEY

GEARBOX LUBRICATION

BACKGROUND OF THE INVENTION

It has been found that the use of a baffle adjacent the gears in gearboxes provides a means whereby rotation of the gears causes the lubricant accumulated in the baffle to be splashed into the lower portion of the housing below the baffle. The baffle reduces the quantity of lubricant engaging the gears and thereby reduces the turbulence created when the gears are run in an excess of liquid. Reducing this turbulence minimizes the heat generated and reduces the energy loss due to the friction created when the gears are run in an excess of lubricant.

However, it is necessary that a portion of the lubricant remain in the baffle so that it can be picked up by the rotating gears for the purpose of lubricating and cooling the gears. Thus, in the past, it has been the practice to provide the baffle with a small perforation or metering hole whereby the lubricant level will be restored in the baffle when the gears are not running and also will permit a small amount of lubricant to flow into the baffle to maintain proper lubrication and cooling of the gears when they are running.

In such gearboxes, it has been extremely difficult to determine the proper lubricant level when filling the gearbox since the rather viscous lubricant does not equalize readily within and without the baffle. The lubricant does not readily flow through the previously provided perforations. As a result, it is necessary to consume considerable time when refilling the gearbox with lubricant or when simply checking the level therein because the gears must be stopped for a considerable length of time so that the lubricant can equalize within and without the baffle.

SUMMARY OF THE INVENTION

It is an object of this invention to provide a gearbox having an improved arrangement for providing the proper amount of lubricant for cooling and lubricating the gears and, yet, a gearbox wherein the lubricant level can be determined accurately and quickly.

Another object of the invention is to provide an improved gearbox wherein the liquid level can be easily and quickly determined during filling of the gearbox with lubricant.

A further object of the invention is to provide an improved gearbox wherein the lubricant level can be quickly and accurately determined with a minimum of downtime.

This invention provides an improved gearbox including a housing having spaced fill and drain openings and containing meshing gears and a liquid for lubricating and cooling the gears, the improvement comprises: a baffle member in the housing partially enclosing the gears, the baffle member dividing the housing into upper and lower chambers and having portions extending above the level liquid and having a port aligned with the drain opening; and, a plug in the drain opening having an extended portion. The extended portion of the plug includes a passageway providing restricted liquid flow between the chambers when the plug is in the first position. The plug is movable in the drain opening to a second position wherein the extended portion is out of the port thereby providing substantially uninhibited liquid flow between the chambers through the port whereby the liquid level in the first and second chambers quickly equalizes. Thus, the liquid level therein can be quickly ascertained. The foregoing and additional objects and advantages of the invention will become more apparent as the following detailed description is read in conjunction with the accompanying drawings wherein like referenced characters denote like parts in all views.

DETAILED DESCRIPTION OF THE PREFERRED EMBODIMENT

Figure 1:
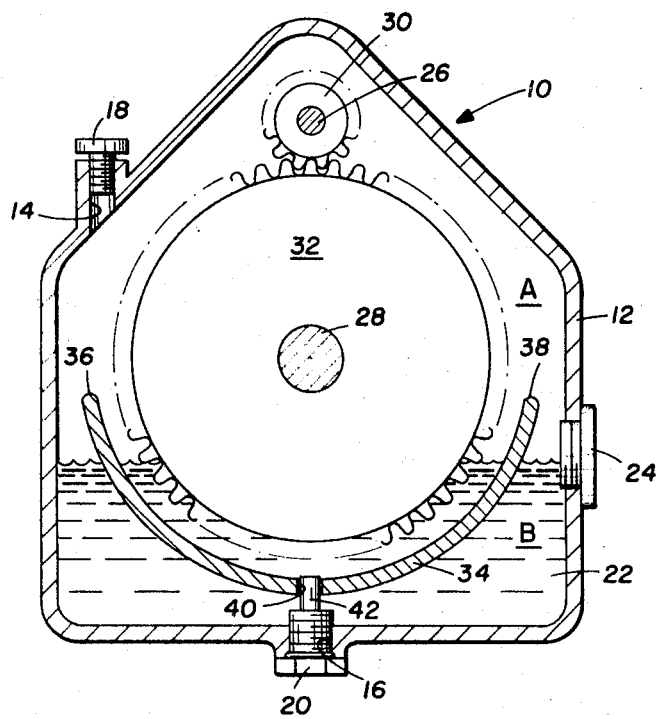
FIG. 1 is a cross-sectional view illustrating a gearbox constructed in accordance with the invention and with the gears in a nonrotating condition.

Referring to the drawing and FIG. 1 in particular, shown therein and generally designated by the reference character 10 is a gearbox constructed in accordance with the invention. The gearbox 10 includes a housing 12 having a fill opening 14 located in the upper portion thereof and a drain opening 16 located in the lower portion thereof. A fill plug 18 is positioned in the fill opening 14 and a drain plug 20, which will be described in more detail hereinafter, is positioned in the drain opening 16.

The housing 12 is partially filled with a lubricant 22. The gearbox 10 may be provided with any suitable type of apparatus for determining the level of the lubricant 22. However, FIG. 1 illustrates a sight glass 24 that has been positioned in the side of the housing 12 at approximately the proper liquid level so that the level of the lubricant 22 can be visually observed.

The housing 12 also journals shafts 26 and 28. Meshing gears 30 and 32 are mounted on the shafts 26 and 28, respectively.

A baffle 34 is mounted in the housing 12 generally between the fill opening 14 and the drain opening 16 and generally divides the housing 12 into an upper chamber A and a lower chamber B. In its preferred form, the baffle 34 is arcuate in cross section partially encircling the gear 32, as shown in FIG. 1, and has edges 36 and 38 projecting above the level of the liquid 22. The port 40 extends through the lowermost portion of the baffle 34 and is sized to receive an extension 42 of the drain plug 20.

Figure 2:
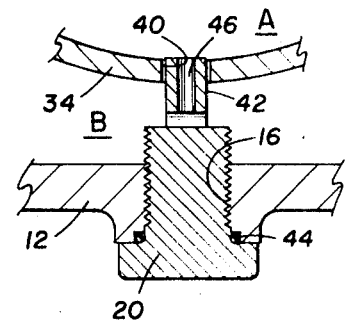
FIG. 2 is an enlarged cross-sectional view of a portion of the gearbox of FIG. 1, showing the drain plug in more detail.

As may be seen more clearly in FIG. 2, the drain plug 20 and the drain opening 16 are provided with mating threads so that the plug 20 can be screwed into and out of the housing 12. An O-ring seal 44 encircles the drain plug 20 and is arranged to sealingly engage the housing 12 when the drain plug 20 is in the position illustrated in FIG. 2.

The extension 42 of the drain plug 20 is provided with a passageway 46 that extends therethrough providing restricted communication between the upper and lower chambers A and B, respectively, of the housing 12. If desired, the extension 42 can be provided with a flattened exterior portion rather than the passageway 46 so long as restricted fluid communication between the chambers A and B is maintained.

OPERATION OF THE PREFERRED EMBODIMENT

Figure 4:
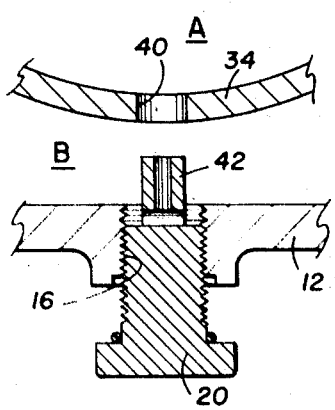
FIG. 4 is an enlarged cross-sectional view similar to FIG. 2, but showing the drain plug removed from the port in the baffle.

When it is desired to operate the gearbox pin, the fill plug 18 is removed from the fill opening 14 and lubricant poured into the housing 12. The drain plug 20 is partly unscrewed in the housing 12 until it reaches the position illustrated in FIG. 4. That is, the drain plug is unscrewed until the extension 42 is completely clear of the port 40 in the baffle 34.

With the drain plug 20 in this position, lubricant 22 entering the housing 12 can flow freely between the chambers A and B and quickly equalize in level so that a person filling the gear box 10 can quickly and accurately ascertain the true level of the lubricant 22 through the sight glass 24. When the proper amount of lubricant 22 has been poured into the housing 12, the fill plug 18 is replaced in the fill opening 14 and the drain plug 20 is screwed into the housing 12 until the extension 42 is positioned in the port 40 of the baffle 34 as shown in FIG. 2.

Figure 3:
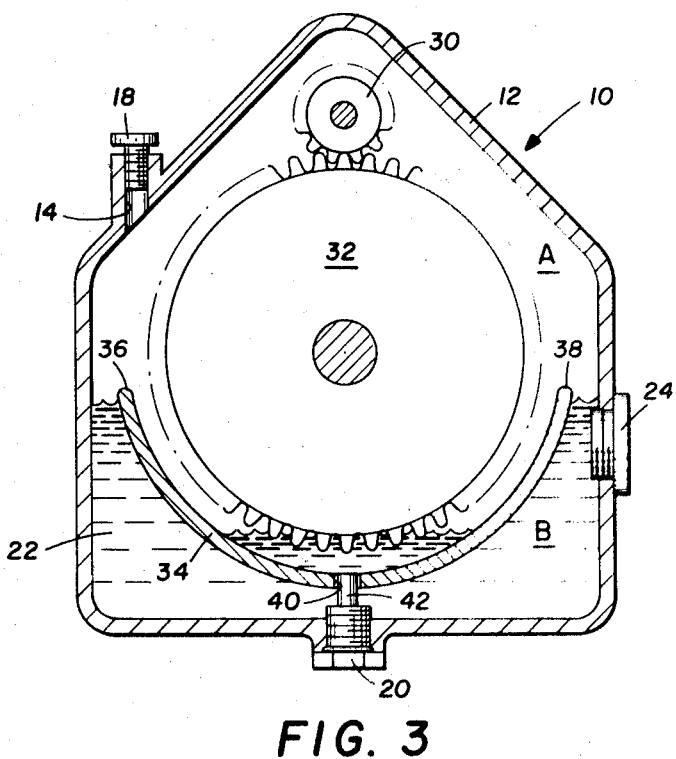
FIG. 3 is a cross-sectional view similar to FIG. 1 illustrating the condition of the gearbox when the gears are rotating.

The gears 30 and 32 are then placed in motion. Rotation of the gear 32 splashes lubricant 22 in the chamber A over the edge 36 or 38, depending upon the direction or rotation of the gear 32, until only a small amount of the lubricant 22 remains in the chamber A as illustrated in FIG. 3. (Fig. 3 is intended to be illustrative only since the amount and disposition of the lubricant 22 in the baffle 34 will depend upon its viscosity and the speed and direction of rotation of the gear 32.)

In any event, sufficient lubricant 22 remains in the baffle 34 to engage the teeth of the gear 32 and provide for the proper cooling and lubrication of the gears 30 and 32. As the lubricant 22 in the baffle 34 is consumed, additional lubricant 22 flows slowly through the restricted passageway 46 in the plug 20 from the chamber B into the chamber A so that proper lubrication and cooling will be maintained.

As is readily apparent in FIG. 3, the level of the lubricant 22 can not be accurately determined with the gears running due to the difference in the liquid level in the chambers A and B. With the gearbox 10 constructed as described hereinbefore, the actual level of the lubricant 22 can be quickly determined by stopping the rotation of the gears 30 and 32 and backing the drain plug 20 out of the drain opening 16 until the extension 42 is again removed from the port 40 and the baffle 34.

The level of the lubricant 22 in the chambers A and B quickly equalizes due to the relatively large size of the port 40. As soon as the level of the lubricant 22 has equalized, the operator can again quickly and accurately determine the lubricant level by observation through the sight glass 24. Thus, the gear box 10 need be stopped only for a very short period of time to determine whether additional lubricant 22 must be added.

The embodiments of the invention in which an exclusive property or privilege is claimed are defined as follows:

1. In a device including a housing having spaced fill and drain openings and containing meshing gears and a liquid for lubricating and cooling the gears, the improvement comprising:

a baffle member in said housing partially enclosing the gears, said baffle member dividing said housing into upper and lower chambers and having portions extending above the level of the liquid and having a port coaxially aligned with the drain opening; and a plug in the drain opening having an extended portion, said extended portion including a passageway providing restricted liquid flow between said chambers when said plug is in a first position, said plug being moveable in the drain opening to a second position wherein said extended portion is out of said port providing substantially uninhibited liquid flow between said chambers through said port.

2. The device of claim 1 and also including means located in the housing for determining the level of liquid therein.

3. The device of claim 1 wherein said baffle member has an arcuate cross section generally concentric with one of the gears.

4. The device of claim 1 wherein said plug is located in and closes the drain opening when in said second position thereof.

5. In a device including a housing having spaced fill and drain openings and containing meshing gears and a liquid for lubricating and cooling the gears, the improvement comprising:

a baffle member of arcuate cross section located in said housing partially enclosing the gears, said baffle member dividing said housing into upper and lower chambers and having edge portions disposed above the liquid level, said baffle having a port located generally midway between said edges and in coaxial alignment with the drain opening; and, a plug moveably located in the drain opening and including an extended portion having a passageway extending therethrough, said plug being moveable between a first position wherein said extended portion is located in said port providing restricted liquid flow between said chambers and a second position wherein said extended portion is out of said port permitting substantially unrestricted liquid flow through said port, said plug closing the drain opening in both positions thereof.

* * * * *